Patented Jan. 7, 1947

2,414,022

UNITED STATES PATENT OFFICE 2,414,022

VINYL CHLORIDE-VINYLIDENE CHLORIDE COPOLYMER PLASTICIZED WITH BIS (CARBOALKOXY) DIETHYL ETHER

Albert M. Clifford and Joy G. Lichty, Stow, Ohio, assignors to Wingfoot Corporation, Akron, Ohio, a corporation of Delaware No Drawing. Application November 12, 1943, Serial No. 510,035

2 Claims. (Cl. 260—36)

This invention relates to the plasticization of copolymers of vinyl chloride and vinyldiene chloride with a bis (carboalkoxy) diethyl ether in which the alkoxy groups, which may be the same or different, contain one to eight carbon atoms. The plasticized product may be used for coatings, etc., as for coating rayon. The preferred plasticizer is bis (carboisoamyloxy) diethyl ether,

$C_5H_{11}OOCC_2H_4.O.C_2H_4COOC_5H_{11}$

To illustrate the invention, 40 parts of this plasticizer may be added to 100 parts of the copolymer of vinylidene chloride and vinyl chloride which contains 10 to 25 parts of vinylidene chloride and 90 to 75 parts of vinyl chloride. The amount of plasticizer may be varied, of course, and much smaller amounts may be used; and, likewise, somewhat more plasticizer may be used when a highly flexible coating or the like is required. The plasticized composition may be applied to a fabric—for example, white 150 denier rayon—to give a moistureproofed sheet for the preparation of raincoats and the like.

When heated to boiling temperature, this coating stiffened somewhat but retained its soft feel at relatively low temperatures. It discolored slightly on aging.

Other plasticizers than that referred to specifically above include bis (carbomethoxy) diethyl ether, bis (carboethoxy) diethyl ether, bis (carbopropoxy) diethyl ether, bis (carbobutoxy) diethyl ether, etc.

What we claim is:

1. A plasticized composition composed essentially of the copolymer of vinylidene chloride and vinyl chloride formed from 10 to 25 per cent of vinylidene chloride and 90 to 75 per cent of vinyl chloride, which composition is plasticized with a bis (carboalkoxy) diethyl ether the alkoxy groups having from one to eight carbon atoms.

2. A plasticized composition composed essentially of the copolymer of vinylidene chloride and vinyl chloride formed from 10 to 25 per cent of vinylidene chloride and 90 to 75 per cent of vinyl chloride, which composition is plasticized with bis (carboisoamyloxy) diethyl ether the alkoxy groups having from one to eight carbon atoms.

ALBERT M. CLIFFORD.
JOY G. LICHTY.